June 24, 1958 G. F. CRITCHLOW 2,840,648

ELECTRIC SIGNAL TRANSMISSION

Filed Nov. 15, 1956 2 Sheets-Sheet 1

INVENTOR
G. F. CRITCHLOW
BY
G. F. Heuerman
ATTORNEY

June 24, 1958 G. F. CRITCHLOW 2,840,648

ELECTRIC SIGNAL TRANSMISSION

Filed Nov. 15, 1956 2 Sheets-Sheet 2

INVENTOR
G. F. CRITCHLOW
BY
G. F. Heuerman
ATTORNEY

United States Patent Office 2,840,648

Patented June 24, 1958

2,840,648

ELECTRIC SIGNAL TRANSMISSION

George F. Critchlow, Morristown, N. J., assignor to Bell Telephone Laboratories, Incorporated, New York, N. Y., a corporation of New York Application November 15, 1956, Serial No. 622,435

2 Claims. (Cl. 179—171)

Figure 1:
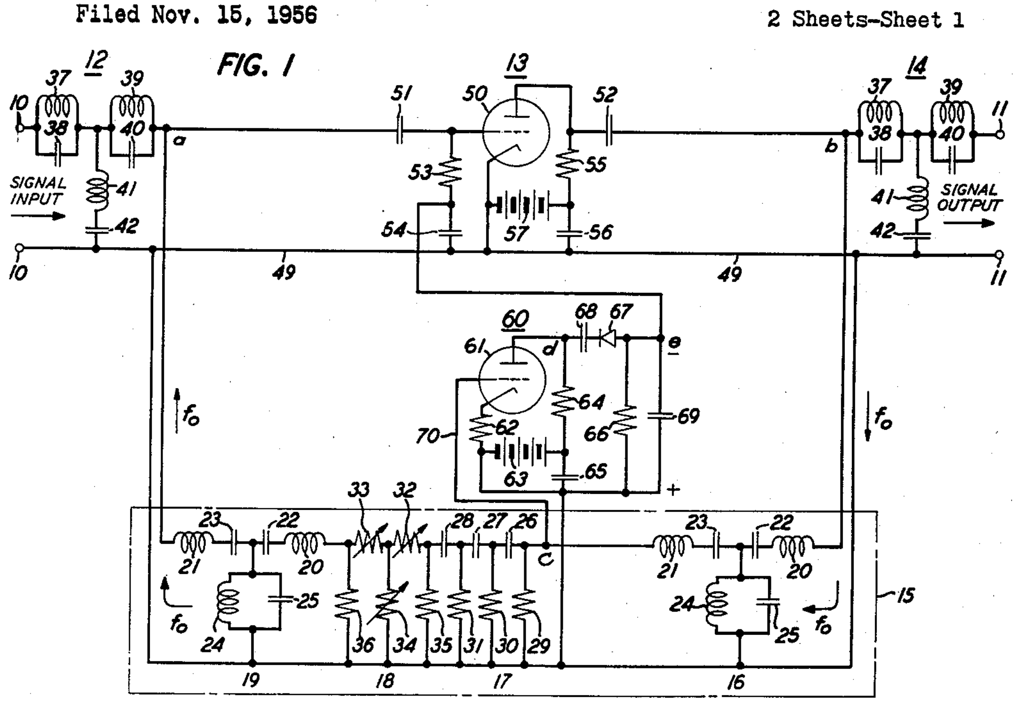

This invention relates to electric signal transmission and particularly to the control of amplification in signal transmission systems.

An object of the invention is to provide improved means for controlling the transmission or gain of an amplifier.

Another object is to provide means for stabilizing the gain of an amplifier without substantial reduction of available gain.

In accordance with a specific embodiment of the invention, herein shown and described for the purpose of illustration, there is provided a transmission path including an amplifier for amplifying electric signals within a predetermined frequency range impressed upon the transmission path. There is provided a positive feedback path coupling the output of the amplifier to its input for causing the generation of an oscillatory current in the loop comprising the signal amplifier and the positive feedback path. The feedback path comprises filtering means for suppressing signal frequency components and for transmitting only a control current having a frequency outside the signal frequency range. That is, thte control current frequency may be either above or below a single signal frequency range or the control current frequency may be in a gap in the signal frequency band in which there is no signal frequency so that there will be signal frequencies both above and below the control current frequency. In either case the control current frequency will be outside the signal frequency range. The feedback path may transmit a single frequency wave, for example. An amplifier-rectifier having its input coupled to the feedback path is provided for setting up a direct voltage proportional to the amplitude of the oscillations in the feedback path. This direct voltage is impressed upon the control circuit of the amplifier in the signal transmission path to control the gain of the amplifier. If the gain of the signal amplifier should increase slightly, for example, the amplitude of the oscillatory wave would increase. As a result, the direct biasing voltage produced by the amplifier-rectifier and impressed upon the control circuit of the signal transmitting amplifier would change in a direction to cause the gain of the signal amplifier to decrease. The gain of the signal amplifier is thus returned to the gain which it had before the initially assumed increase in gain occured, since the gain of the oscillatory loop is exactly unity. The change in gain of the amplifier is thus substantially prevented. The signal transmission path includes filtering means for preventing the transmission of the oscillatory wave over the signal transmission path. If desired, the feedback path may include a variable attenuator for changing the amplitude of the oscillatory wave and thereby the gain of the signal amplifier. The frequency of the oscillatory wave may be low relative to a high frequency signal wave, for example, thus permitting the use of a low frequency attenuator to vary the gain of a high frequency transmission path.

The invention may be used to determine the frequency-transmission characteristic of a second amplifier by connecting it in the signal transmission path between the output of the first amplifier and the output of the transmission path and by connecting the feedback loop between the output of the second amplifier and the input of the first amplifier. By measuring the frequency response of the transmission path first with the second amplifier in the circuit and next with the second amplifier omitted from the circuit, the frequency response characteristic of the second amplifier may be determined.

In another embodiment of the invention, there are provided a plurality of amplifiers capable of transmitting different frequency ranges, respectively, each amplifier except the last being in a positive feedback path connecting its output to the input of another amplifier. A first amplifier capable of transmitting a relatively low frequency range has in its feedback path a low frequency variable attenuator for controlling the gain of the first amplifier. The first amplifier is connected in a positive feedback path for a second amplifier capable of transmitting a band of relatively high frequencies. The change in gain of the first amplifier produced in response to a change of attenuation of the attenuator will, in turn, produce a change in gain of the second amplifier. Additional amplifiers may be provided if desired. For example, a third amplifier for transmitting a band of frequencies higher than the frequency band which the second amplifier is capable of transmitting may be provided, the second amplifier being in the positive feedback path of the third amplifier so that the gain of the third amplifier will be controlled in response to a change of gain of the second ampifier.

Figure 2:
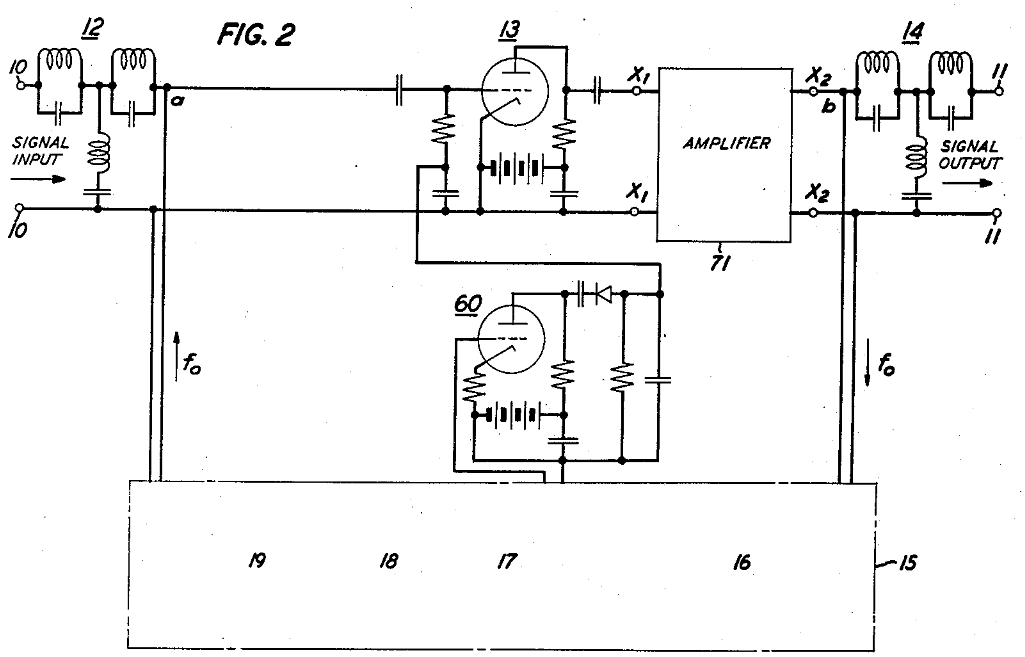
Figure 3:
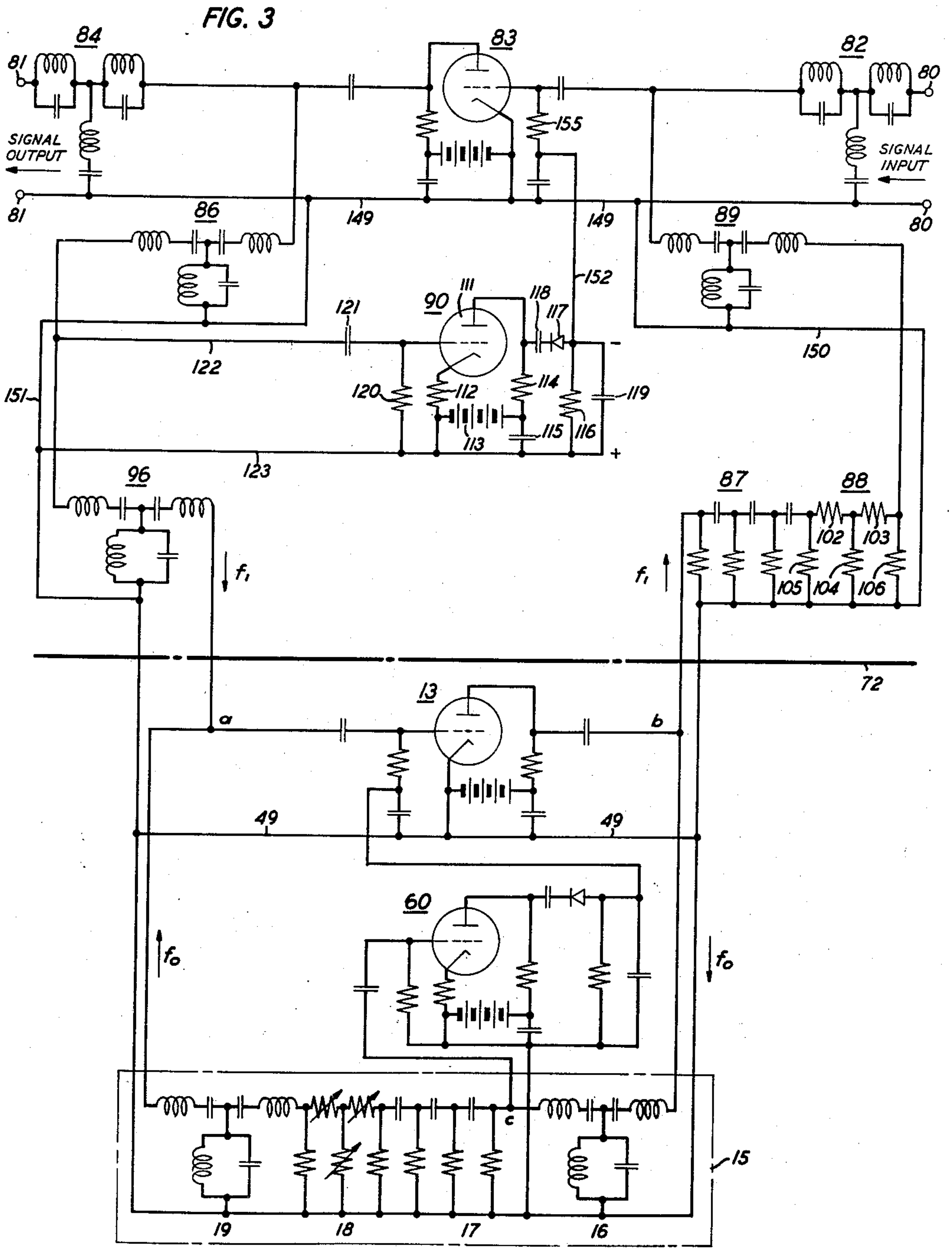

The invention will now be described with reference to the accompanying drawing in which:

Fig. 1 is a schematic view of a transmission circuit embodying the invention; and Figs. 2 and 3, respectively, are schematic views of transmission circuits which are modifications of the transmission circuit shown in Fig. 1.

Referring to Fig. 1 of the drawing, there is provided a signal transmission path having a pair of input terminals 10 which may be connected to a source of signaling electromotive force having one or more frequency components within a predetermined frequency range and a pair of output terminals 11 which may be connected to a suitable signal receiving apparatus or to an additional signal transmission path. The signaling electromotive force is transmitted from the input terminals through an input filter 12, an amplifier 13, and an output filter 14 to the output terminals 11. A positive feedback path comprising circuit elements shown within the rectangle 15 is connected from the output of amplifier 13 to its input. The feedback path comprises an input filter 16, a phase shift network 17, an attenuator 18 and an output filter 19.

The loop comprising the amplifier 13 and the feedback path 15 forms an oscillator for generating a single frequency wave. At the desired frequency of oscillation, $f_0$, for example, and only at this frequency, the transmission of the loop is adjusted to zero phase. The transmission loss in the feedback path coupling the output to the input of amplifier 13 is exactly equal to the transmission gain of the amplifier 13.

Filters 16 and 19 are each designed to pass the frequency $f_0$ of the oscillatory wave and to exclude or eliminate frequencies in the signal frequency range. Filters 12 and 14 are designed to pass the signal frequency components and to suppress the frequency $f_0$ of the oscillatory wave. For example, the frequency $f_0$ may be lower than the frequency components within the signal frequency range. The filters 16 and 19 each comprises series inductive elements 20 and 21, series condensers 22 and 23, and a shunt path having an inductive element 24 and a condenser 25 in parallel. The phase shifter 17 comprises series condensers 26, 27, and 28 and shunt resistors 29, 30, and 31. The variable attenuator comprises variable series resistors 32 and 33, a variable shunt resistor 34 and two fixed shunt resistors 35 and 36. Resistors 32, 33, and 34 are varied simultaneously so as to change the attenuation of the attenuator without changing the input and output impedances of the attenuator, as is well known.

The filters 12 and 14 in the signal transmission path each comprises a series inductor 37 shunted by a condenser 38, a series inductor 39 shunted by a condenser 40, and a shunt path comprising an inductor 41 and condenser 42 in series. Each of these filters suppresses the frequency $f_0$ of the oscillatory wave and passes frequencies within the signal frequency range.

The amplifier 13 comprises a triode 50 having a cathode, a control electrode, and an anode. The lower input terminal 10 is connected to the lower output terminal 11 by a conductor 49 and the cathode of tube 13 is connected to the conductor 49. The output terminal *a* of the filter 12 is connected through a condenser 51 to the control electrode of tube 50. The anode of tube 50 is connected through a condenser 52 to the input terminal *b* of filter 14. A path comprising a resistor 53 and a condenser 54 in series is connected from the control grid of tube 50 to the conductor 49. A path comprising a resistor 55 and a condenser 56 in series is connected from the anode of tube 50 to the conductor 49. A battery 57 is provided for supplying space current to tube 50 through the resistor 55.

An amplifier-rectifier 60 is provided for setting up and impressing upon the tube 50 a biasing voltage which varies in accordance with amplitude changes of the oscillatory wave transmitted through the feedback path 15. The amplifier-rectifier 60 comprises triode 61 having a cathode, an anode, and a control electrode. The cathode is connected through a resistor 62 to the conductor 49. Space current is supplied to tube 61 from a battery 63, the space current flowing through a resistor 64 and through resistor 62. A condenser 65 is connected across battery 63. There is provided a current path comprising a resistor 66, a rectifier element 67, and a condenser 68, all in series, for connecting the conductor 49 to the anode of tube 61. A condenser 69 is connected across the resistor 66. Condensers 69 and 54 are connected in parallel. A conductor 70 connects the control grid of tube 61 to terminal *c* of the feedback path 15, this terminal *c* being a common terminal of condenser 26 and resistor 29 of the phase shift circuit 17 and of inductor 21 of filter 16.

It will thus be seen that the oscillatory wave $f_0$ in the feedback circuit is impressed upon the input of amplifier 61. After being amplified, the oscillatory wave is rectified by the rectifying element 67 to set up across condensers 69 and 54, in parallel, a direct voltage proportional to the amplitude of the oscillatory wave. If, for example, the gain of amplifier 13 should increase slightly, the amplitude of the oscillatory wave would increase to increase the biasing voltage across condenser 54, thus making the control grid of tube 50 relatively more negative with respect to its cathode. The gain of amplifier 13 is thus returned to the gain which it had before the assumed increase of gain occurred, since the gain of the oscillatory loop is exactly unity. In addition to thus automatically controlling the gain of amplifier 13 to maintain it constant, the gain may also be increased or decreased under manual control by adjusting the attenuator 18. A decrease of attenuation of the attenuator 18, for example, will result in a decrease of gain of the amplifier 13.

With the exceptions noted below, the circuit depicted in Fig. 2 is the same as the circuit of Fig. 1 and the corresponding parts have the same designations. A second amplifier 71 is connected between the output terminals X1 of the first amplifier 13 and the input terminals X2 of the filter 14. The positive feedback path 15, comprising the filter 16, the phase shifter 17, the attenuator 18 and the filter 19, connects the output of amplifier 71 to the input of amplifier 13. The purpose of this circuit is to stabilize the absolute gain of the combination of the two amplifiers 13 and 71 at the frequency of oscillation, thus making it possible to determine the frequency response characteristic of amplifier 71 even if its absolute gain is not stable. The frequency response characteristic of the amplifier 71, per se, may be determined by measuring the transmission between input terminals 10 and output terminals 11 at each of a plurality of frequencies within the signal frequency range first with the amplifier 71 in circuit, as shown, and next with the amplifier 71 out of circuit and the pair of terminals X1 conductively connected to the pair of terminals X2. With the amplifier 71 out of circuit, the circuit will be as shown in Fig. 1. The gain or ratio of output voltage to input voltage at any given frequency of amplifier 71 will be the gain of the circuit between input terminals 10 and output terminals 11 with the amplifier 71 in circuit divided by the gain of the circuit with the amplifier 71 out of the circuit. If the amplification is measured in transmission units, the transmission of the amplifier 71 at a given frequency will be equal to the transmission of the circuit between the input and output terminals with the amplifier 71 in the circuit minus the transmission of the circuit with the amplifier 71 out of circuit.

In Fig. 3, the portion of the circuit below the dash-dot line 72 is substantially the same as the circuit of Fig. 1 except that the input terminals 10, the output terminals 11, and the filters 12 and 14 have been omitted. The corresponding parts in the two figures have the same designations.

There is provided a signal transmission path having a pair of input terminals 80 which may be connected to a source of signaling electromotive force having frequency components within a predetermined frequency range and a pair of output terminals 81 which may be connected to signal receiving apparatus. The signaling electromotive force is transmitted from the input terminals 80 through an input filter 82, similar to the filter 12, an amplifier 83, similar to the amplifier 13, and an output filter 84, similar to the filter 14, to the output terminals 81. There is provided a positive feedback path connecting the output of amplifier 83 to its input. The feedback path comprises filters 86 and 96, similar to the filter 16, amplifier 13, phase shifter 87, similar to the phase shifter 17, a fixed attenuator 88 and an output filter 89, similar to the filter 19. The attenuator 88 comprises series resistors 102 and 103 and shunt resistors 104, 105, and 106. An amplifier-rectifier 90 is provided for amplifying and rectifying a portion of the oscillatory wave generated in the loop comprising amplifier 83 and the feedback path 86, 96, 13, 87, 88, and 89. The rectified output voltage of amplifier-rectifier 90 is impressed upon the control electrode-cathode circuit of amplifier 83 to bias the control electrode negatively with respect to the cathode.

The amplifier-rectifier 90 comprises a triode 111 having a cathode, an anode, and a control electrode. The cathode is connected through a resistor 112 and through leads 123 and 151 to a conductor 149 which connects the lower input terminal 80 to the lower output terminal 81. Conductors 150 and 151 connect the conductor 149 to the conductor 49. The control electrode of tube 111 is connected through a condenser 121 to a conductor 122. Conductors 122 and 123 are connected to the common terminals of filters 86, 96 in the feedback path 86, 96, 13, 87, 88, and 89. Space current is supplied to tube 111 from a battery 113 through a circuit comprising a resistor 114 and resistor 112. A condenser 115 is connected across battery 113. There is provided a current path comprising a resistor 116, a rectifying element 117 and a condenser 118, all in series, connecting the conductor 123 and, therefore, the conductor 149, to the anode of tube 111. A condenser 119 is connected across the resistor 116. The common terminal of rectifier element 117 and of condenser 119 is connected through a conductor 152 and through a resistor 155 of amplifier 83 to the control electrode of amplifier 83. The other terminal of condenser 119 is connected through conductors 123, 151 and 149 to the cathode of amplifier 83. The biasing voltage set up across the condenser 119 is thus impressed upon the control electrode-cathode circuit of the amplifier 83 to bias the control electrode negatively with respect to the cathode.

The amplifier 13 and the positive feedback path 16, 17, 18, and 19 form an oscillatory circuit for generating a wave having a frequency $f_0$ which is outside the range of frequency components of the signal impressed upon the input terminals 80. The amplifier 83 and its positive feedback path 86, 96, 13, 87, 88, and 89 form an oscillatory circuit for generating a wave having a frequency $f_1$ which is outside the range of frequency components of the signal impressed upon the input terminals 80 and which differs from the frequency $f_0$. Each of the filters 16 and 19 passes the frequency $f_0$ and suppresses the frequency $f_1$ and frequencies within the signal frequency range. The filters 86, 96, and 89 each passes the frequency $f_1$ and suppresses the frequency $f_0$ and the signal frequency components.

The amplifier 83 may be designed to transmit frequencies extending over a range of high frequencies which range does not include the relatively low frequency $f_0$, the amplitude of which can be varied by the low frequency attenuator 18, for example. The frequency $f_1$ generated in the loop 83, 86, 96, 13, 87, 88, and 89 may be near the lower end of the frequency range capable of being transmitted by the amplifier 83. The amplifier 13 will be designed to transmit a range of relatively low frequencies, the frequency $f_0$ being included in this range at its lower portion and the frequency $f_1$ being included in this range at its upper portion. With such an arrangement, the relatively low frequency range and the relatively high frequency range capable of being transmitted by amplifiers 13 and 83, respectively, will overlap somewhat so that each of these amplifiers will transmit the frequency $f_1$.

It will thus be observed that the gain of the high frequency amplifier 83 can be controlled by the low frequency attenuator 18. If, for example, the attenuation or transmission loss introduced by the attenuator 18 is increased, the gain of amplifier 13 will increase by the same amount. Moreover, the increase of gain of amplifier 13 will cause the gain of amplifier 83 to decrease by the same amount. If desired, of course, additional amplifiers may be employed each having a positive feedback path as described. In that case, the amplifier 83, will be connected in the positive feedback loop of the next additional amplifier and the decrease of gain of amplifier 83 will cause an increase of gain of the additional amplifier by the same amount.

What is claimed is:

1. In combination, a first amplifier for amplifying electric signals within a predetermined frequency range, a first current loop comprising said first amplifier and a first feedback path for causing the generation in said first current loop of a first alternating current having a first frequency outside said signal frequency range, said first feedback path comprising a second amplifier and means for suppressing said signal frequencies, a second current loop comprising said second amplifier and a second feedback path for causing the generation in said second current loop of a second alternating current having a second frequency different than said first frequency and outside said signal frequency range, a variable attenuator, said second feedback path comprising said variable attenuator and means for suppressing said signal frequencies and said first frequency, and means responsive to attenuation changes in said second loop introduced by said variable attenuator for controlling the gain of said second amplifier and thereby controlling the gain of said first amplifier.

2. In combination, a first amplifier having a first input and a first output for amplifying electric signals having frequency components within a first predetermined frequency range, a positive feedback path for said first amplifier for causing the generation of electric oscillations having a first frequency which is outside the first signal frequency range, means responsive only to said oscillations having said first frequency for controlling the gain of said first amplifier, a second amplifier having a second input and a second output for amplifying electric signals having frequency components within a second predetermined frequency range excluding said first frequency, a positive feedback path for said second amplifier comprising said first amplifier for causing the generation of electric oscillations having a second frequency which differs from said first frequency and which is outside the frequency range of the signals amplified by said second amplifier, and means responsive only to said oscillations having said second frequency for controlling the gain of said second amplifier.

References Cited in the file of this patent

UNITED STATES PATENTS

| | | |
|---|---|---|
| 2,311,807 | Anderson | Feb. 23, 1943 |
| 2,346,545 | Anderson | Apr. 11, 1944 |
| 2,623,954 | Van Zelst | Dec. 30, 1952 |
| 2,623,955 | Van Zelst | Dec. 30, 1952 |
| 2,721,977 | Rich | Oct. 25, 1955 |